US005155077A

United States Patent [19]

Montreuil et al.

[11] Patent Number: 5,155,077
[45] Date of Patent: Oct. 13, 1992

[54] CATALYST FOR PURIFICATION OF LEAN-BURN ENGINE EXHAUST GAS

[75] Inventors: Clifford Montreuil, Dearborn; Haren S. Gandhi, Farmington Hills; Mohinder S. Chattha, Dearborn, all of Mich.

[73] Assignee: Ford Motor Company, Dearborn, Mich.

[21] Appl. No.: 753,780

[22] Filed: Sep. 3, 1991

[51] Int. Cl.⁵ .............................................. B01J 29/06
[52] U.S. Cl. ...................................... 502/66; 502/64; 502/71
[58] Field of Search .......................... 502/64, 71, 66; 423/213.2

[56] References Cited

U.S. PATENT DOCUMENTS

| | | | |
|---|---|---|---|
| 3,180,712 | 4/1965 | Hamblin | 23/288 |
| 3,284,370 | 11/1966 | Clifford et al. | 423/213.2 |
| 3,374,183 | 3/1968 | Cooper | 252/463 |
| 3,544,264 | 12/1970 | Hardison | 23/2 |
| 3,702,236 | 11/1972 | Fessler | 23/288 F |
| 3,896,616 | 7/1975 | Keith et al. | 60/274 |
| 3,914,377 | 10/1975 | Anderson et al. | 423/213.7 |
| 3,953,576 | 4/1976 | Meguerian et al. | 423/213.7 |
| 4,100,262 | 7/1978 | Pelrine | 423/329 |
| 4,188,364 | 2/1980 | Gladden | 423/213.2 |
| 4,297,328 | 10/1981 | Ritscher et al. | 423/213.2 |
| 4,377,502 | 3/1983 | Klotz | 423/328 |
| 4,705,675 | 11/1987 | Desmond et al. | 423/326 |
| 4,934,142 | 6/1990 | Hayashi et al. | 60/297 |
| 4,962,075 | 10/1990 | Green et al. | 502/64 |
| 4,973,399 | 11/1990 | Green et al. | 208/120 |
| 4,985,210 | 1/1991 | Minami | 422/169 |
| 5,017,538 | 5/1991 | Takeshima | 502/64 |

FOREIGN PATENT DOCUMENTS

| | | |
|---|---|---|
| 3912596 | 11/1989 | Fed. Rep. of Germany . |
| 62284480 | 5/1989 | Japan . |
| 62291258 | 5/1989 | Japan . |
| 62292914 | 5/1989 | Japan . |
| 62292915 | 5/1989 | Japan . |
| 62296422 | 5/1989 | Japan . |
| 62296423 | 5/1989 | Japan . |
| 62310607 | 6/1989 | Japan . |
| 62316108 | 6/1989 | Japan . |

*Primary Examiner*—Carl F. Dees
*Attorney, Agent, or Firm*—Joseph W. Malleck; Roger L. May

[57] ABSTRACT

A dual-phase zeolite having a transition metal-containing zeolite phase and a transition metal-containing oxide phase. The catalytic material may be an intimate mixture of a phase-layered structure of a first phase constituted preferably of a copper-containing high silica zeolite and a second phase constituted of copper-containing zirconia.

Methods are also disclosed for making a single-stage catalyst for removing $NO_x$ and HC at high efficiency in an oxygen-rich automotive exhaust gas, and for treating the exhaust gas with the dual-phase catalyst above.

9 Claims, 2 Drawing Sheets

CATALYST FOR PURIFICATION OF LEAN-BURN ENGINE EXHAUST GAS

BACKGROUND OF THE INVENTION

1. Technical Field

This invention relates to the technology of engine exhaust gas purification, and more particularly to the technology of removing $NO_x$ at high efficiency in an oxygen-rich atmosphere from lean side air/fuel (A/F) ratio combustion.

2. Discussion of the Prior Art

Much of the prior art catalysts were designed to operate in a somewhat oxygen-deficient environment since engines were operated at or about stoichiometric combustion. Optimally, commercially available automotive catalysts will not promote reduction of $NO_x$ in an environment of excess oxygen; the traditional reductant, rhodium, is restricted to a narrow window of A/F if ammonia production is to be avoided.

High silica zeolites ($2XM/_n.XAl_2O_3.YSiO_2$) of the transition metal ion exchange type, when loaded on an alumina carrier, have demonstrated a desirable ability to act as a molecular sieve and create active sites (a surface on which NO can compete with $O_2$ for reacting with a reductant), thus permitting reduction of $NO_x$ to take place in an oxidizing environment.

One of the earliest applications of high silica zeolites to the purification of engine exhaust gases is disclosed in U.S. Pat. No. 4,297,328, wherein a copper exchanged zeolite is deployed. The copper is most effective as the ion exchange metal because it is active at lower temperatures (such as present in a lean-burn engine exhaust) than other metals known to date. Such catalyst was used to perform as a three-way catalyst in an oxidizing environment and was found to initially possess a high absorption capacity for organic materials at high temperatures without preference for water.

Unfortunately, transition metal containing zeolites degrade at high temperatures usually found in automotive exhaust systems. The catalyst, that is, the transition metal, tends to react with the alumina of the zeolite and form an aluminate which acts as a low surface area material preventing the transition metal from being actively catalytic and thereby reduces the catalytic activity of the entire system.

SUMMARY OF THE INVENTION

The invention is a dual-phase zeolite having a transition metal containing zeolite phase and a transition metal containing oxide phase. The catalytic material may be an intimate mixture or a phase-layered structure of a first phase constituted preferably of a copper-containing high silica ZSM5 zeolite and a second phase constituted of copper-containing zirconia.

The invention, according to another aspect of this invention, is directed to a method of using or treating automotive exhaust gases, including the step of contacting the exhaust gases with such dual-phase zeolite.

DETAILED DESCRIPTION AND BEST MODE

Figure 1:
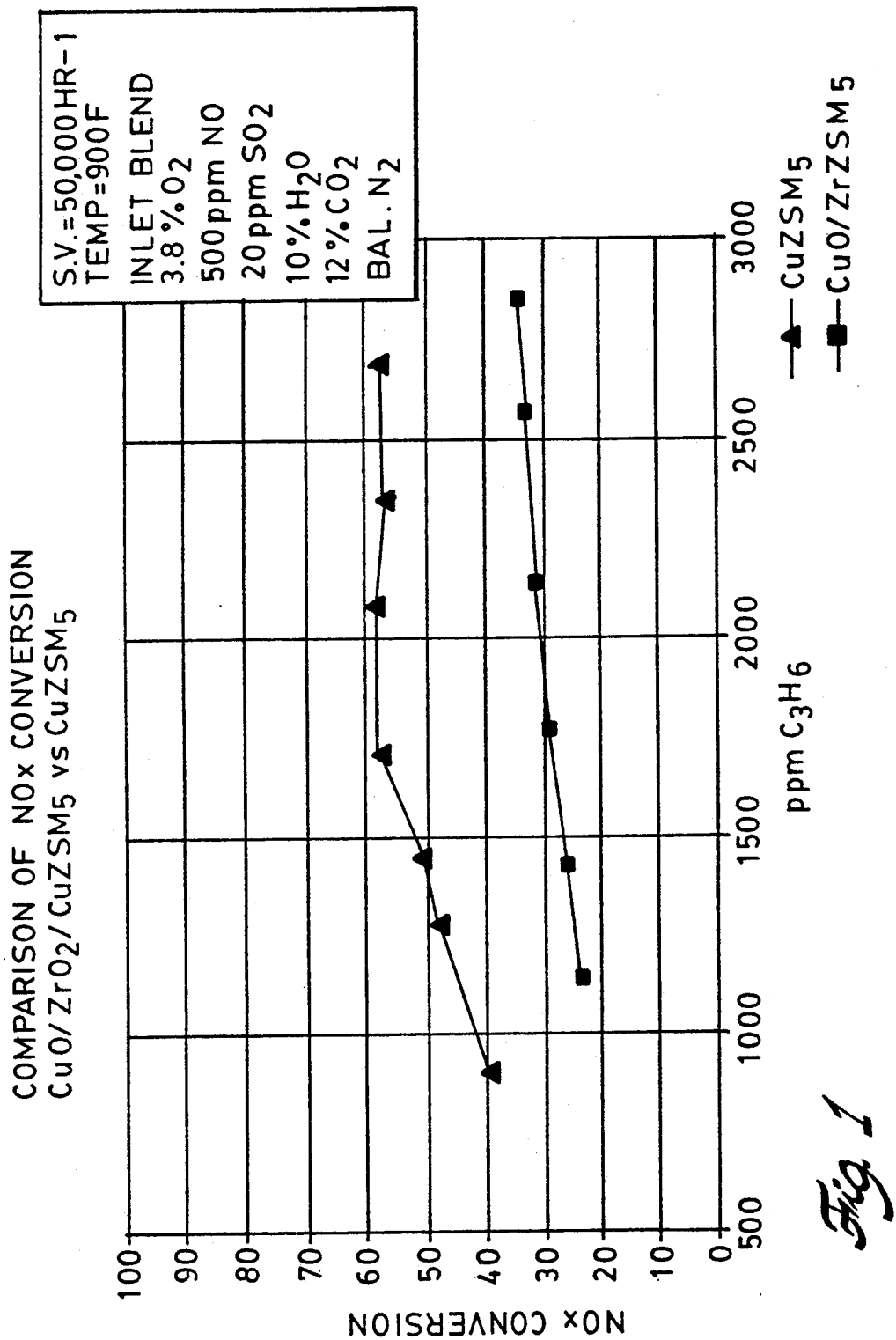
FIG. 1 shows a comparison of $NO_x$ conversion efficiency as a function of propylene concentration in the gas flow treated over (i) a conventional CuZSM5 monolithic catalyst, and (ii) over a $CuO/ZrO_2$/CuZSM5 monolithic catalyst in conformity with the preferred embodiment of this invention.

The catalyst of this invention comprises a combination of two materials or phases, a transition metal-containing oxide and a transition metal-containing zeolite. This combination may be in the form of an intimate mixture of the two materials or phases, or in the form of a layer of one material carrying a layer of the other (preferably a layer of transition metal-containing oxide on top of the transition metal containing zeolite which is deposited on a substrate). Transition metal herein is limited to the class of copper, cobalt, nickel, chromium, iron, manganese, silver, zinc, calcium, and compatible mixtures thereof; transition metal includes the elemental metal itself as well as the metal oxide thereof. The transition metal present in the two materials of this catalyst preferably are the same, that is, if the zeolite contains copper, then the oxide contains copper. Preferably, this transition metal is copper; copper is particularly preferred because it is active at lower temperatures.

Generally, the phase materials can be employed in a ratio between about 10–90% and 90–10% by weight (preferably they are employed in a weight ratio between about 40–60% and 60–40% by weight).

Oxide

The transition metal-containing oxide can be made by various techniques, as will be apparent to one skilled in the art in view of the present disclosure. Preferably, the oxide is zirconia and the metal it contains is copper. Other oxides operable for the purpose of this invention can be selected from the group consisting of lanthana, titania, silica, zirconia, and very minor proportions of lanthanum aluminate or barium hexaluminate. Zirconia is most desired because it has a low interaction with support metals or oxides. However, titania and silica each will reduce poisoning and thus provide some inventive benefit.

Copper-containing zirconia will be discussed herein as representative of an embodiment of such transitional metal-containing oxide according to the present invention. One method of making a copper-containing zirconia comprises soaking a quantity of zirconia, in the form of a fine powder, repeatedly, if desired, in a solution of a copper compound, subsequently dried, then calcined at an elevated temperature between 300°–600° C., often at about 450° C. Alternatively, a zirconium nitrate solution may be combined with a copper compound to produce a precipitate.

The copper compound should be one that is soluble or that can be dispersed in a liquid, that is, those which are soluble in an aqueous solution or which can be solubized therein, e.g., with the aid of an acid or base. Exemplary of such copper compounds are copper salts like copper nitrate and copper sulphate; organo-copper compounds like carboxylates of copper, copper acetate, and copper-cupric amines; organo-complexes of copper like diamine copper acetate; tetraamine copper sulphate, and copper acetylacetonate. Soluble compounds, exemplary of other transition metal compounds, include cobalt acetate, nickel acetate, ferric chloride, chromic nitrate, and manganese acetate.

The saturated zirconia is then dried and calcined in air, the copper compound decomposing to form copper oxide. If, on the other hand, calcining is carried out in a reducing atmosphere, the copper compound may be reduced to elemental copper. Preferably, copper is present in an amount between about 0.1–20% by weight in the copper-containing oxide. When the first phase of the catalyst is placed in use, oxygen present in the exhaust gas will oxidize the copper to copper oxide.

Zeolite

In addition to the transition metal-containing oxide, the catalyst contains a transition metal-containing zeolite. The zeolite is desirably a high silica zeolite having an $SiO_2/Al_2O_3$ molar ratio which exceeds about 10, preferably up to about 60 (see U.S. Pat. No. 4,297,328, which is expressly incorporated herein by reference for teaching of other zeolites or class of zeolites that may be used herein).

The transition metal, such as copper, is provided into the zeolite by ion exchange. Again, the transition metal may be selected from the group consisting of Cu, Co, Ni, Cr, Fe, Mn, Ag, Zn, Ca, and compatible mixtures thereof. Generally, a sodium, hydrogen, or ammonium zeolite is contacted by an aqueous solution of another cation, in this case an aqueous solution of a soluble copper compound such as copper acetate, wherein replacement of the sodium, hydrogen, or ammonium ion by copper ion takes place. It is advantageous to provide as much transition metal ion in the zeolite as possible since the amount of transition metal present in the zeolite is directly related to the catalytic activity of the first phase catalyst. Preferably, this is at least 3% up to a maximum determined by the $SiO_2/Al_2O_3$ ratio. After replacing the sodium, hydrogen, or ammonium ion with the metal ion, the zeolite is generally washed to remove excess surface transition metal compound. It is not necessary to do so, however. The catalyst may further be manufactured by grinding each of the copper-containing oxide and the copper-containing zeolite to a fine powder, mixing them together, forming a slurry of them, and then applying the slurry to a substrate such metal or ceramic honeycomb. While it is preferable to make the catalyst in this way, it may be made by layering one material onto the other.

A series of catalyst examples were prepared to corroborate the scope of the invention herein.

EXAMPLE (a) A copper acetate monohydrate (7.8 g) is dissolved in 150 ml of acetic acid/water mixture (50:50). Zirconia, 50 g, is placed in a beaker and is impregnated with the copper acetate solution by incipient wetness technique. Three impregnations are necessary to finish all of the solution. The impregnated material is dried at 120° C. between impregnations and after the final impregnation. The impregnated material was then calcined at 600° C. for four hours.

(b) A high silica zeolite was ion-exchanged with copper; obtained from a commercial source as Cu-ZSM-5.

The material contained 3% by weight ion-exchanged copper and was in a powder form suitable for direct use.

(c) A mixture was prepared from equal amounts of materials (a) and (b) above and ball-milled into a slurry in distilled water. The slurry was applied to a cordierite monolith carrier in several steps to obtain a 33% loading of the material of the aggregate catalyst sample weight. The final drying was carried out at 120° C. for three hours and calcination is carried out at 600° C. for four hours.

Comparisons were undertaken to establish the efficiency of the catalyst to convert hydrocarbons and nitric oxide in an automotive exhaust-type gas. The simulated exhaust gas treatment tests were then used to compare the hydrocarbon conversion efficiency of this example with reference to a conventional copper exchanged high silica zeolite (Cu-ZSM-5). The conditions under which the test was performed included an inlet gas blend of 3.8% $O_2$, 500 ppm NO, 20 ppm $SO_2$, 10% $H_2O$, 12% $CO_2$, and the balance nitrogen. The catalyst substrate was tested at a space velocity of about 50,000 $hr^{-1}$ and at a gas temperature of about 900° F. As shown in FIG. 1, the variation of nitric oxide conversion efficiency with the variable content of propylene in the synthesized exhaust gas is displayed. The much greater nitric oxide conversion efficiency of this invention is evident from such Figure. At all data points, the $NO_x$ conversion is roughly 2:1 better when the catalyst contains $ZrO_2$ with CuO. This proves that more copper is available as catalyst for reduction because it is prohibited from combining with the $Al_2O_3$ by forming its own oxide.

Figure 2:
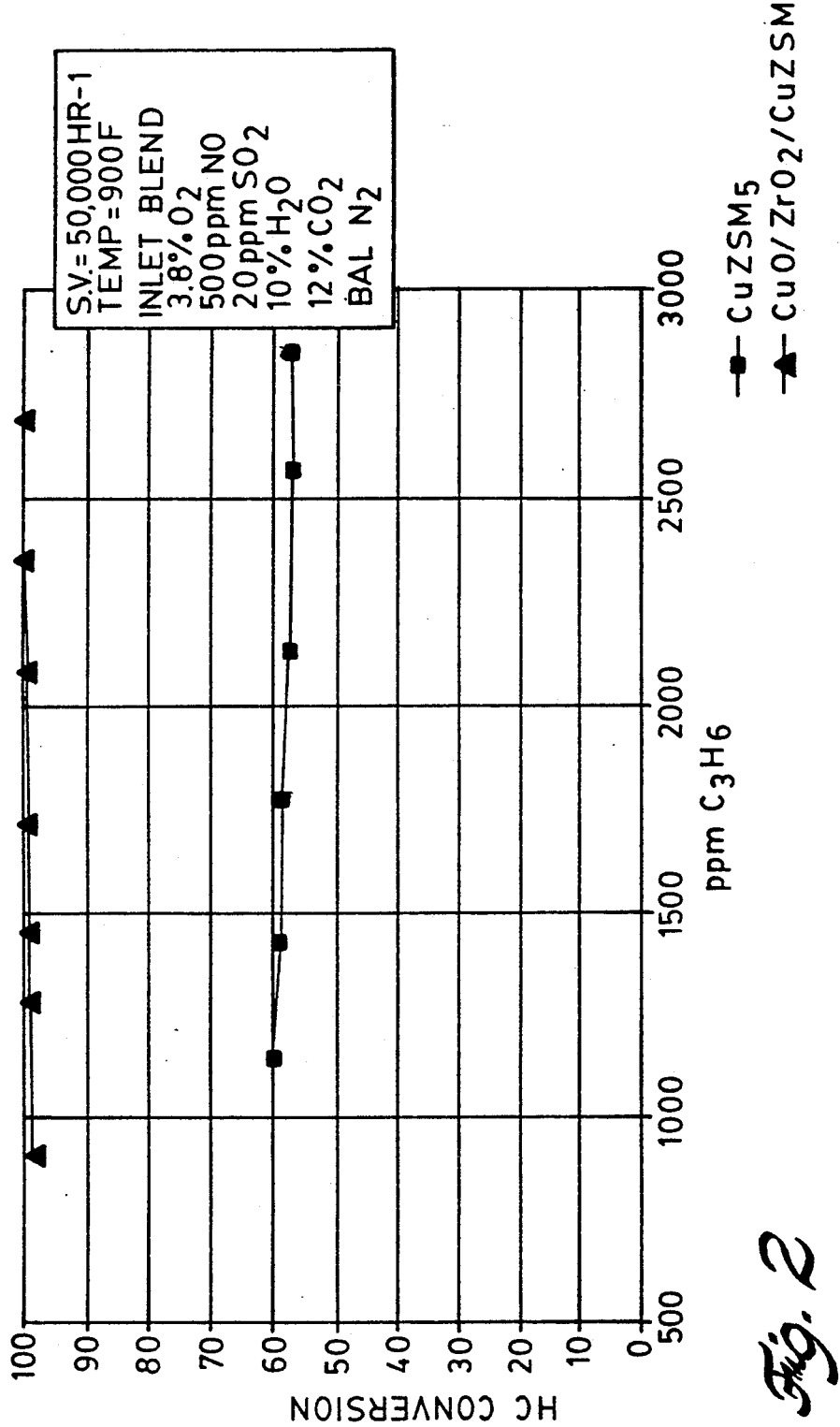
FIG. 2 graphically shows a comparison of hydrocarbon conversions over a wide range of hydrocarbon concentrations (propylene) when using a conventional CuZSM5 monolithic catalyst as compared to a $CuO/ZrO_2/CuZSM5$ monolithic catalyst according to an embodiment of the present invention.

Similarly, a comparison of hydrocarbon conversion efficiency was determined as shown in FIG. 2. Again, the catalyst of this invention provided a superior hydrocarbon conversion efficiency compared to that of a conventional copper ion-exchanged zeolite.

As shown in Table I, variations of the oxide as well as the zeolite in the second phase catalyst were made to determine the affect, if any, on the conversion efficiency of $NO_x$ in an automotive exhaust gas. The temperature of the treated exhaust gas was about 425° C., space velocity of 50 K $hr^{-1}$.

Examples 2 through 4 were prepared in accordance with the procedure used to prepare Example 1, except that in each case a different transition metal was used for formulating the zirconia oxide and the ion exchange of the zeolite. Example 3, with Ag, worked quite well at the 425° C. temperature. Substituting other refractory oxides for zirconia (Examples 5–8) showed little change in the $NO_x$ conversion efficiency.

With respect to Examples 9–10, the base zeolite itself was varied as listed while maintaining the copper modified zirconium oxide and copper exchange in the zeolite as a constant. The conversion efficiency for these examples showed that the total Cu content was progressively limited which reduced $NO_x$ conversion efficiency somewhat. Examples 11–13 varied the ratio between the first and second phases of such single-stage catalyst.

TABLE I

| Example | Oxide TM/ | Zeolite TM/ | Oxide/ Zeolite | $SiO_2/Al_2O_3$ | Conversion Efficiency | | |
|---|---|---|---|---|---|---|---|
| | | | | | $NO_x$ | NC | CO |
| 1 | $CuO/ZrO_2$ | Cu/ZSM-5 | 1/1 | 40 | 48 | 75 | 3 |
| 2 | $CoO/ZrO_2$ | Co/ZSM-5 | 1/1 | 40 | 50 | 70 | 5 |
| 3 | $Ag_2O/ZrO_2$ | Ag/ZSM-5 | 1/1 | 40 | 55 | 65 | 10 |
| 4 | $ZnO/ZrO_2$ | Zn/ZSM-5 | 1/1 | 40 | 25 | 30 | 0 |
| 5 | $CuO/Ba,Al_2O_3$ | Cu/ZSM-5 | 1/1 | 40 | 45 | 74 | 3 |

TABLE I-continued

| Example | Oxide TM/ | Zeolite TM/ | Oxide/ Zeolite | $SiO_2$/ $Al_2O_3$ | Conversion Efficiency | | |
|---|---|---|---|---|---|---|---|
| | | | | | $NO_x$ | NC | CO |
| 6 | $CuO/La_2O_3$ | Cu/ZSM-5 | 1/1 | 40 | 48 | 74 | 3 |
| 7 | $CuO/TiO_2$ | Cu/ZSM-5 | 1/1 | 40 | 47 | 75 | 3 |
| 8 | $CuO/SiO_2$ | Cu/ZSM-5 | 1/1 | 40 | 47 | 74 | 3 |
| 9 | $CuO/ZrO_2$ | Cu/mordenite | 1/1 | 60 | 40 | 72 | 5 |
| 10 | $CuO/ZrO_2$ | Cu/ferrierite | 1/1 | 10 | 30 | 69 | 4 |
| 11 | $CuO/ZrO_2$ | Cu/ZSM-5 | ½ | 40 | 39 | 72 | 3 |
| 12 | $CuO/ZrO_2$ | Cu/ZSM-5 | ⅓ | 40 | 30 | 70 | 3 |
| 13 | $CuO/ZrO_2$ | Cu/ZSM-5 | ¼ | 40 | 25 | 65 | 3 |

We claim:

1. A catalyst for purification of lean-burn engine exhaust gas, comprising:
a dual-phase, high silica zeolite supported on a high surface area substrate, the first phase consisting of a catalytic transition metal containing oxide and the second phase consisting of a catalytic transition metal containing high silica zeolite.

2. The catalyst as in claim 1, in which said substrate is an alumina carrier.

3. The catalyst as in claim 1, in which said transition metal is selected from the group consisting of Cu, Co, Ni, Cr, Fe, Mn, Ag, Zn, Ca, and compatible mixtures thereof.

4. The catalyst as in claim 1, in which said zeolite has a $SiO_2/Al_2O_3$ molar ratio greater than 10.

5. The catalyst as in claim 4, in which said zeolite is ultrastable, of the form $2XM/_n.XAl_2O_3.YSiO_2$, where M is the cation and n is the valance.

6. The catalyst as in claim 1, in which said zeolite, regardless of the metal replacing the cation, retains a spatial arrangement of aluminum, silicon, and oxygen that forms a basic crystal lattice that remains essentially unchanged.

7. The catalyst as in claim 1, in which said oxide is selected from the group consisting of zirconia, lanthana, titania, silica, zirconium aluminate, and barium hexaluminate.

8. The catalyst as in claim 1, in which the ratio of said phases is in the range of 90/10-10/90.

9. The catalyst as in claim 1, in which said oxide is zirconia present in an amount of 0.1-20 weight percent of said catalyst.

* * * * *